July 22, 1969  H. B. WOLF  3,457,459
ELECTRICAL SYSTEM INCLUDING CAPACITORS
Filed Nov. 22, 1965
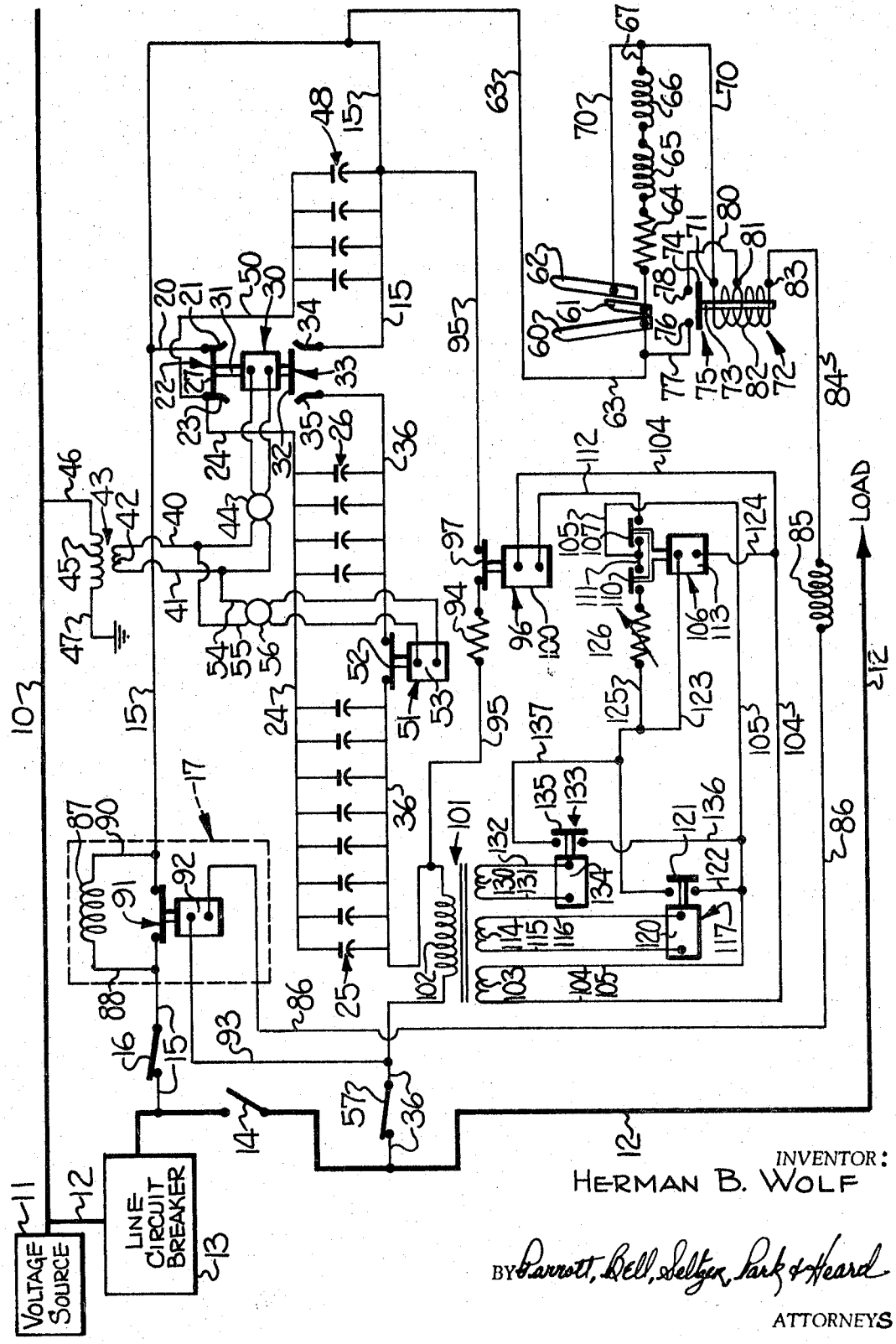
INVENTOR:
HERMAN B. WOLF
ATTORNEYS

United States Patent Office 3,457,459
Patented July 22, 1969

3,457,459
ELECTRICAL SYSTEM INCLUDING CAPACITORS
Herman B. Wolf, Charlotte, N.C., assignor to R. H. Bouligny Inc., Charlotte, N.C., a corporation of North Carolina
Filed Nov. 22, 1965, Ser. No. 508,974
Int. Cl. H02h 7/16; G05f 1/68
U.S. Cl. 317—12                                    2 Claims

ABSTRACT OF THE DISCLOSURE

Means for protecting a bank of capacitors connected in a main alternating current electrical circuit wherein a fault current limiting means is connected in the main circuit under certain circumstances for limiting fault current flowing therein to a safe value and an auxiliary circuit is connected to the main circuit in shunting relation to the bank of capacitors. Means are provided in the auxiliary circuit for normally maintaining the auxiliary circuit open, for completing the circuit to shunt the bank of capacitors in response to a predetermined voltage rise across the capacitors due to an appearance of a fault on the main circuit, and for operatively connecting the fault current limiting means into the main circuit upon current flow in the auxiliary cirucuit.

---

The present invention relates to an alternating current electrical system or circuit and more particularly to such an electrical system or circuit which includes a bank of capacitors.

An electrical circuit which has a bank of capacitors, within which the capacitors are connected in parallel to each other, connected in series with a load is quite common and such capacitors are commonly referred to in the trade as "series capacitors." Such capacitors comprise a facility which, within the limitations of current flow in the circuit and capacitor bank capacity, provides a voltage boost to the circuit and at the same time contributes to the reactive component of power in the circuit. The voltage output of such a capacitor bank (hereinafter referred to as "boost voltage") is proportional to the square of the current and any KVAR (kilo-volt ampere reactive power component) generated in the capacitor bank as a result of current flow in excess of the circuit requirement will be supplied to the system to which the circuit is connected.

Frequently, the voltage supplied from a voltage source to a circuit or system (hereinafter referred to as "applied voltage") will vary from the desired normal applied voltage and the load connected thereto will also vary considerably from very light load to peak load conditions. Since the bank of capacitors is coordinated with the normal applied voltage and the normal load connected to the circuit with a suitable safety factor, variances in applied voltage will adversely affect the condition of the circuit and equipment connected thereto and will frequently result in damage to the circuit and/or equipment connected thereto.

In a distribution circuit, for example, if the applied voltage rises appreciably above the predetermined normal voltage, this increased applied voltage plus the normal boost voltage being supplied by the bank of capacitors will result in excess voltage being supplied to customers and particularly those customers who are relatively close to the sub-station from which the distribution circuit emanates. This over-voltage may and will frequently exceed the voltage rating of electrical equipment connected to the circuit and will result in damage to this equipment, such as burned-out light bulbs and other equipment failures. Conversely, if the applied voltage on a distribution circuit, for example, drops below the predetermined normal applied voltage, and particularly if this voltage drop occurs during periods of peak load, the boost voltage being supplied by the bank of capacitors will also decrease and there will not be sufficient voltage on the circuit to supply the power necessary to properly operate the equipment connected thereto.

It is, therefore, an object of the present invention to provide an electrical circuit or system wherein the capacitance in the circuit is increased or decreased in response to changes in the applied voltage for controlling the voltage on the circuit to maintain this voltage substantially uniform irrespective of variances in the applied voltage. This object of the present invention is accomplished by providing a second bank of capacitors connected in parallel to and properly correlated with the first bank of capacitors and by adding this second bank of capacitors to the circuit or removing the same therefrom in response to changes in the applied voltage to decrease the boost voltage being supplied to the circuit in the event of a rise in the applied voltage or to increase the boost voltage and KVAR being supplied to the circuit in the event of a drop in the applied voltage.

In addition to the more-or-less normal variances in voltage discussed above, an emergency situation will sometimes occur wherein the applied voltage will drop to a very low value. When this occurs, the applied voltage and boost voltage are at such a low value that the equipment connected to the circuit cannot be operated and frequently damage to the circuit and/or equipment will result.

Accordingly, a more specific object of the present invention is to provide an emergency voltage boost and KVAR supply on a circuit when the applied voltage drops to a point indicating an emergency situation. This object is accomplished in a distribution circuit as described above, for example, by a third bank of capacitors which is connected in parallel with the second bank of capacitors. In response to a first predetermined voltage drop, the second bank of capacitors is removed from the circuit, and in response to a further second predetermined voltage drop, the second and third banks are connected in parallel to each other and are connected in series with the first bank of capacitors thereby substantially decreasing the capacitance in the circuit and thereby substantially increasing the boost voltage and supplying a large block of KVAR to the circuit.

It is also well known that circuits which include a bank of capacitors are frequently subject to faults, such as short circuits, lightning surges and the like, wherein the current flowing in the circuit increases to the point where the voltage appearing across the bank of capacitors increases beyond the voltage capabilities of the capacitors and damage to the capacitors and/or other circuit components frequently results. Various and sundry means have been heretofore proposed for protecting the capacitors from the effects of such faults. In my co-pending applications, Ser. No. 254,626, filed Jan. 29, 1963, now Patent No. 3,255,-382, and entitled Protective Device for Series Capacitor Circuits, and Ser. No. 297,560, filed July 25, 1963, now Patent No. 3,274,445, and entitled Method and Means for Increasing Permissible Normal Operating Voltage Impressible on and for Improving the Operation of an Electrical Transmission System, I have disclosed the first really effective protective devices for capacitor circuits. These protective devices include a calibrated arc gap connected in parallel to the bank of capacitors and fault current limiting means for limiting fault current flowing in the circuit to a safe value. The arc gap of these protective devices is constructed and arranged so that an arc is established thereacross upon a predetermined voltage rise across the bank of capacitors upon the occurrence of a fault and so that the arc is maintained during the existence of the fault on the circuit.

While these protective devices successfully protect the capacitors and other components of the circuit from the adverse effects of the fault current, there is substantial undesirable noise and flame attendant to the arc existing across the arc gap and particularly with long duration faults. Also, while the electrodes of these protecting devices are particularly constructed to withstand repeated and long duration arcs existing therebetween, these electrodes eventually will become damaged by such arcs and particularly where there are repeated long duration faults of very high current.

It is, therefore, another object of the present invention to provide an improved protecting device for a bank of capacitors wherein the noise and flame attendant to an arc upon the occurrence of a fault is substantially reduced and wherein fault current is limited to a safe value. This object of the present invention is accomplished by providing means in combination with a calibrated arc gap and fault current limiting means for shunting the arc gap upon the establishment of an arc to thereby extinguish the arc while still maintaining the shunting circuit path around the bank of capacitors.

It is further well known that circuits including capacitors therein are occasionally subject to resonance, such as ferro-resonance and sub-synchronous resonance. Ferro-resonance may occur at the instant when the circuit which includes an iron core reactance, such as an unloaded or lightly loaded transformer, is energized, and sub-synchronous resonance may occur when the circuit includes a large motor which is subject to being started when the circuit is otherwise unloaded or lightly loaded. A definite relationship must exist between the capacitance and reactance before ferro-resonance will occur and, in addition, the instant of closing or completion of the circuit must be at a definite portion of the 60-cycle wave.

Accordingly, another object of the present invention is to provide a capacitor circuit wherein ferro-resonance, sub-synchronous resonance or both are suppressed until all likelihood of the same occurring has passed and wherein normal operation of the circuit is not adversely affected thereafter.

Some of the objects of the invention having been stated, other objects will appear as the description proceeds when taken in connection with the accompanying drawing, in which—

The drawing comprises a schematic view of an electrical system or circuit incorporating the features of the present invention.

Referring now more specifically to the drawing, there is shown therein all features of the present invention connected in a circuit, such as a distribution circuit but which in certain instances may be a transmission circuit or any other desired circuit. In all instances, a bus line 10 or the like is connected to an alternating current voltage source 11 which normally supplies a predetermined applied voltage thereto and may be a station bus, a transmission line or a portion of a system or network. Bus line 10 may be single phase, two phase or three phase as required, with a single phase having been shown, but it being understood that if a multiphase circuit is used, bus line 10 represents one phase thereof and the other phases will be substantially as shown.

A distribution line 12 or the like is connected to bus line 10 at one end and is connected to a suitable load which may be of any desired character. Line 12 has a line circuit breaker 13 connected therein which is of conventional construction, and also has a normally open, manually operable switch 14 connected therein.

CAPACITOR CIRCUIT

A circuit will now be described for connecting capacitors into the line 12 between the bus line 10 and the load. This circuit includes a line 15 which is connected at one end to line 12 between the line circuit breaker 13 and the manually operable switch 14. Line 15 has a normally closed, manually operable switch 16 connected therein and if the line 12 is a transmission line normally having an applied voltage exceeding a predetermined value, e.g. 35,000 volts, line 15 will preferably have connected therein a fault current limiting device, broadly indicated at 17, to be described in detail hereinafter.

A line 20 is connected at one end to line 15 and at its other end to one stationary contact 21 of a normally closed switch 22. The other stationary contact 23 of switch 22 has one end of a line 24 connected thereto, the remainder of which is connected to one side of first and second banks of capacitors 25 and 26, respectively. The movable contact 27 of switch 22 is moved between open and closed position by an actuator means 30, which is illustrated in the drawing as a solenoid having its plunger 31 connected at one end to the movable contact 27. The other end of the plunger 31 is connected to a movable contact 32 of a normally open switch 33, one stationary contact 34 of which has the other end of line 15 connected thereto. The other stationary contact 35 of switch 33 has one end of a line 36 connected thereto. Line 36 is connected to the other side of first and second banks of capacitors 25, 26 and to line 12 on the opposite side of switch 14 from line 15.

Switches 22 and 33 are of the transfer type which means that switch 33 is closed before switch 22 is opened and vice versa. Switches 22 and 33 and actuator means 30 therefor combine to form a selector switch assembly for controlling the capacitance in the capacitor circuit in a manner to be presently described. In this respect, the coil of solenoid 30 is connected by lines 40, 41 to the secondary winding 42 of a voltage transformer 43 through the contacts of a voltage controlled relay 44.

Voltage transformer 43 has one side of the primary winding 45 thereof connected to bus line 10 by a line 46 and the other side thereof connected to neutral and ground by a line 47. Therefore, voltage transformer 43 has the applied voltage carried by bus line 10 impressed thereon and the voltage controlled relay 44 is set to be actuated when the voltage impressed on secondary winding 42 is above a predetermined value which occurs when the applied voltage is above a predetermined value. Therefore, solenoid 30 is energized when the applied voltage is above the predetermined value, but if the applied voltage falls below this value, the relay 44 will be deactivated and solenoid 30 will be de-energized and will open switch 22 and close switch 33.

A third bank of capacitors 48 has one side thereof connected to line 15 and has a line 50 connected to the other side thereof which is also connected to contact 23 of switch 22. Therefore, with switch 22 closed and switch 33 open, the third bank of capacitors 48 is not connected in the capacitor circuit and has no effect thereon. However, when switch 22 is opened and switch 33 is closed in response to a drop in the applied voltage, the third bank of capacitors 47 is connected in parallel to the second bank of capacitors 26.

Normally closed contactor means 51 is interposed in line 36 between the first and second bank of capacitors 25 and 26 and includes a switch 52 and an actuator means connected thereto which is shown as a solenoid 53. Solenoid 53 has the coil thereof connected by lines 54, 55 to lines 40, 41 respectively between secondary winding 42 and voltage controlled relay 44 and through a second voltage controlled relay 56. It is noted that second voltage controlled relay 56 is set to be actuated when a higher voltage is impressed on secondary winding 42 than first voltage controlled relay 44, which higher voltage is a predetermined amount less than the normal voltage impressed thereon when the normal applied voltage is being carried by bus line 10.

A normally closed, manually operable switch 57 is connected in line 36 adjacent its connection to line 12 to permit manual control of the capacitor circuit.

The operation of the capacitor circuit will now be described, and in such operation, switch 14 is normally open and switches 16 and 57 are normally closed so that the capacitor circuit is connected in series in line 12. Under normal applied voltage conditions, both voltage controlled relays 44 and 56 will be actuated and solenoids 30 and 53 will be energized and switches 22 and 52 will be closed and switch 33 will be open. First and second banks of capacitors 25 and 26 are, therefore, connected in parallel to each other and will function as a single bank of capacitors to supply boost voltage and KVAR to line 12.

Upon a first predetermined drop in the applied voltage, voltage controlled relay 56 will be deactuated and solenoid 53 will be de-energized and switch 52 will be opened. This will remove the second bank of capacitors 26 from the capacitor circuit which will decrease the capacitance therein and will result in increased boost voltage and KVAR being supplied to line 12 by the remaining first bank of capacitors 25.

Upon a second predetermined or major drop in the applied voltage which is below the first predetermined drop, indicating an emergency condition, voltage controlled relay 44 will be deactuated and solenoid 30 will be de-energized which will open switch 22 and close switch 33, it being again noted that switch 33 will be closed before switch 22 is opened. This will connect the third bank of capacitors 48 in parallel with the second bank of capacitors 26 and, since switch 52 is open, the second and third banks of capacitors 26 and 48 will be connected in series with the first bank of capacitors 25. Accordingly, the capacitance of the capacitor circuit will be greatly decreased, e.g. as illustrated in the drawing the capacitance would be halved and the boost voltage and KVAR being supplied to line 12 and bus line 10 will be greatly increased or doubled as illustrated in the drawing.

Of course, the third bank of capacitors 48 may and will frequently not be required and in such cases will be omitted along with the selector switch assembly. Also, there will be frequent instances when the second bank of capacitors 26 will not be required to be connected in the capacitor circuit under normal applied voltage conditions. In such cases, the voltage controlled relay 56 will be pre-set to be actuated upon a predetermined rise in the applied voltage and the second bank of capacitors 26 will be used to provide voltage control in line 12.

PROTECTING DEVICE FOR CAPACITOR CIRCUIT

As stated, capacitor circuits are susceptible to damage in the event of a fault occurring therein and, therefore, the present invention provides means for protecting the capacitor circuit from the adverse effects of fault current. This protecting means includes first, second and third electrodes 60, 61 and 62, with the first and second electrodes, 60, 61 having their lower portions arranged and spaced to define a calibrated arc gap therebetween and being upwardly and outwardly diverging therefrom to define an arc chute therebetween. The third electrode 62 is disposed closely adjacent but spaced from second electrode 61 and on the opposite side thereof from first electrode 60 and extends thereabove to define with first electrode 60 an extension of the arc chute. This electrode arrangement is substantially the same as is shown and described in more detail in my co-pending application, Ser. No. 297,560, now Patent No. 3,274,445, referred to above.

First electrode 60 is connected to line 15 by a line 63 and an energy dissipating resistor 64, an arc driving coil 65 and an arc restraining coil 66 are connected in a line 67 which is connected at one end to the second electrode 61 and at its other end to a line 70. Line 70 in turn is connected at one end to third electrode 62 and at its other end to one end terminal 71 of a special contactor means, illustrated in the form of a three terminal solenoid 72. The plunger 73 of solenoid 72 carries a movable contact 74 of a switch 75, one stationary contact 76 of which is connected by a line 77 to line 63. The other stationary contact 78 of switch 75 is connected by a line 80 to the intermediate terminal 81 of the coil 82 of solenoid 72. The other end terminal 83 of solenoid 72 is connected by a line 84 to one side of a fault current limiting reactor 85, the other side of which is connected to a line 86. The reactance of fault current limiting reactor 85 is correlated to the capacitor circuit, and functions to limit the fault current flowing therein to a safe value.

For very high applied voltages, however, such as 35,000 volts and higher, additional fault current limiting means will be required to properly limit fault current to a safe value. Such additional fault current limiting means is broadly indicated at 17 and includes a fault current limiting reactor 87 which has opposite sides thereof connected to line 15 by lines 88, 90, respectively. A normally closed switch 91, preferably of the vacuum circuit breaker type, is connected in line 15 between the points of connection of lines 88, 90 so that the fault current limiting reactor 87 is normally shunted thereby. An actuator means for switch 91 is illustrated as a solenoid 92, and has the line 86 connected to one side thereof and a line 93 connects the other side thereof to line 36.

The operation of the protective device of the present invention will now be described. When a fault occurs on the capacitor circuit, increased current will flow therein and a voltage increase will occur across the bank of capacitors. When this voltage increase reaches a predetermined value, an arc will become established between first and second electrodes 60 and 61 and a circuit will be thereby established in shunting relation to the bank or banks of capacitors and a major portion of the current flowing in the capacitor circuit will flow through this shunting circuit. Resistor 64 will dissipate all or a substantial portion of the energy stored in the capacitors, and at the same time, arc driving and restraining coils 65, 66 will respectively serve to drive the arc upwardly in the arc chute while restraining lateral elongation of the arc out of the chute, all in a manner described in greater detail in my co-pending application Ser. No. 254,626, now Patent No. 3,255,382.

When the arc reaches the top of second electrode 61, the same will be transferred therefrom to third electrode 62 and the arc will then exist between the first and third electrodes 60 and 62 and will continue its upward movement substantially by convection. Upon this transfer of the arc, the energy dissipating resistor 64 and the arc driving and restraining coils 65, 66 will be shunted by the line 70 and current will not flow therethrough.

Upon the establishment of the arc between the electrodes, current will flow through coil 82 of solenoid 72 and the solenoid 72 will be actuated in a very short time after the establishment of the arc. The plunger 73 of solenoid 72 will then be moved to close switch 75 which will complete a shunting circuit through lines 77, 80, switch 75 and the lower portion of coil 82 of solenoid 72 around the electrodes 60, 61 and 62. This shunting circuit will be of lower resistance than the arc gap and will therefore shunt out the arc gap causing the arc to be extinguished. It is noted that the fault current flowing through the lower portion of coil 82 of solenoid 72 will be sufficient to maintain the solenoid actuated and switch 75 closed, but upon return of normal load current conditions in the capacitor circuit, this normal load current will not be sufficient to maintain the solenoid actuated and switch 75 will be rapidly opened to break the shunting circuit around the capacitors.

During current flow through the shunting circuit around the capacitors, the reactor 85 functions to limit fault current flowing through this circuit to a safe value. Also, when the capacitor circuit is part of a transmission line handling voltages in excess of about 35,000 volts, the additional fault current limiting means 17 will be utilized and the current flow through the shunting circuit will energize the actuator means 92 thereof and switch 91 will very quickly open, which opening is particularly quickened if switch 91 is of the preferred vacuum circuit breaker type. Upon opening of switch 91, the reactor 87 will be connected in the capacitor circuit and will aid the reactor 85 in limiting what would otherwise be a very high fault current to a safe value. Upon breakage of the shunting circuit when the fault is removed and the capacitor circuit returns to normal operating condition, the actuator means 92 will be de-energized and switch 91 will be quickly closed to remove the reactor 87 from the capacitor circuit.

RESONANCE SUPPRESSOR

In accordance with this invention, a resonance suppressor is connected in the capacitor circuit for suppressing either ferro-resonance or sub-synchronous resonance or both. This suppressor includes a resistor 94 connected in shunting relation to the capacitors by a line 95 which in turn is connected at its opposite ends to lines 15 and 36, respectively. A contactor means 96 controls the connection of resistor 94 in the capacitor circuit to thereby control its resonance suppressing action and includes a normally closed switch 97 connected in line 95 in series with the resistor 94. Contactor means 96 also includes an actuator means 100 for opening and closing switch 97 and this actuator means is illustrated as being a solenoid.

Contactor means 96 is energized in such a manner that resistor 94 remains connected across the capacitors until all likelihood of resonance occurring has passed. To effect and control the energization of contactor means 96, there is provided a current transformer 101 which has the primary winding 102 thereof connected in line 36 in series with the capacitors. Current transformer 102 is of the iron core type and includes a first secondary winding 103, one side of which is connected by a line 104 to one side of solenoid 100. The other side of secondary winding 103 is connected by a line 105 to a special seal-in relay broadly indicated at 106. Seal-in relay 106 includes normally open, first and second switches 107 and 110 connected in series by a bridge line or bar 111 and line 105 is connected to this bridge line 111. The other side of switch 107 is connected by a line 112 to the opposite side of solenoid 100 from line 104 to complete a circuit thereto when switch 107 is closed.

Switches 107 and 110 have a common actuator means 113 which is illustrated as a solenoid. The solenoid 113 may be energized in either one of two manners depending upon the type of resonance desired to be suppressed by the resistor 94. In this respect, current transformer 101 includes a secondary winding 114, opposite sides of which are connected by lines 115, 116 to a relay contactor means 117. Relay contactor means 117 includes an actuator means 120, illustrated as a solenoid, to which the lines 115 and 116 are connected and also includes a normally open switch 121. Switch 121 has one side thereof connected by a line 122 to the line 105 and the other side thereof connected by a line 123 to one side of solenoid 113, the other side of which is connected to line 104 by a line 124. This completes a first energizing circuit to the seal-in control relay 106. A holding or seal-in circuit is provided to solenoid 113 by a line 125 which connects switch 110 to line 123. A variable resistor 126 is connected in line 125 to vary the current value at which solenoid 113 will become de-energized and thereby vary the drop-out point.

Since ferro-resonance only occurs when an iron core reactance is connected in an unloaded or very lightly loaded circuit and only when the circuit is energized at a particular portion of the 60-cycle wave, such ferro-resonance will be completely eliminated from the circuit if resistor 94 is connected in shunting relation to the capacitor when the circuit is energized and is maintained in such shunting relation until the load reaches a predetermined value. The normally closed switch 97 of contactor means 96 assures that resistor 94 will be connected in shunting relation to the capacitors when the capacitor circuit is energized. Also, actuator means 120 of relay contactor means 117 is selected or pre-set to be energized only when the current flowing in the capacitor circuit reaches a value which would indicate that there is sufficient load on the circuit to prevent ferro-resonance from occurring. This actuator means 120 is also of the type which will close switch 121 almost instantaneously, e.g., 15 cycles, after the current flowing in the line 115, 116 reaches the predetermined value. Upon such closure of switch 121, current will flow from the secondary winding 103 through lines 104 and 124 to one side of solenoid 113 and through lines 105, 122, 123 and switch 121 to the other side of solenoid 113 to thereby energize the same and close switches 107 and 110. Upon closure of switch 107, current will flow through the line 104 to one side of solenoid 100 and through lines 105, 111 and 112 and switch 107 to the other side thereof to energize the same and open switch 97 and remove the resistor 94 from the capacitor circuit. At the same time, current will flow through lines 104 and 124 to one side of solenoid 113 and through lines 105, 111, 125 and 123 and switch 110 to the other side thereof to maintain the same energized even if the switch 121 were to be opened.

Sub-synchronous resonance can be completely eliminated from the capacitor circuit by maintaining resistor 94 in shunting relation to the capacitors until the motor, whose starting would cause the resonance, has sufficient time to reach normal operating speed and thereafter until the load current flowing in the circuit reaches sufficient value such that this resonance may not occur. To accomplish this, transformer 101 has a third secondary winding 130 which has opposite sides thereof connected by lines 131, 132, to a special relay contactor means 133. Relay contactor means 133 includes an actuator means 134, illustrated as a solenoid, to which lines 131, 132 are connected, and a normally open switch 135. Switch 135 has one side thereof connected by a line 136 to line 105 and the other side thereof connected by a line 137 to the line 123.

It is noted that relay contactor 133 should be selected or pre-set to be energized at a lower current than relay contactor means 117, which current is still sufficiently high to indicate that there is sufficient load on the circuit to prevent sub-synchronous resonance from occurring. Also, relay contactor means 133 is specially constructed whereby a predetermined delay, e.g., several seconds, will elapse after energization thereof before the same operates to close switch 135. This predetermined delay should be sufficient for the motor to reach normal operating or running speed before switch 135 is closed and seal-in relay 106 is actuated to remove the resistor 94 from the capacitor circuit. It is noted that the current in the circuit required to start the motor will initially be quite high and will decrease as the speed of the motor increases. Initially upon starting of the motor, this starting current will probably exceed the current at which relay contactor means is energized but the time delay will prevent resistor 94 from being removed from the circuit until the motor reaches normal operating speed. If the motor comprises substantially all of the load on the circuit, the starting current may decrease as the motor speed increases to a point where the current in the circuit under normal operating speed conditions of the motor is below the current value at which relay contactor means 133 is energized and the circuit would then be subject to sub-synchronous resonance occurring if another motor was started thereon. However, if the current does decrease in this manner, relay contactor means 135 will be de-energized before the time delay has expired and resistor 94 will remain in the circuit until the current again exceeds the predetermined value and remains in excess thereof for the time delay period.

It is believed apparent that the present invention provides a novel alternating current electrical capacitor circuit or system in which the capacitance is varied in response to variances in applied voltage to control the voltage being carried by the capacitor circuit; in which the capacitors and circuit are protected by an improved protective device which materially reduces the noise and flame normally attendant to the operation of such devices and fault current is limited to a predetermined safe value; and in which resonance is suppressed or eliminated.

I claim:

1. In a main alternating current electrical circuit having a bank of capacitors connected therein, the combination of means for protecting such capacitors from damage due to overload when a fault appears on said circuit, said means comprising:
    (a) fault current limiting means connected in said main circuit for limiting fault current flowing therein to a safe value,
    (b) an auxiliary circuit connected to said main circuit in shunting relation to said capacitors,
    (c) means interposed in said auxiliary circuit for normally maintaining said auxiliary circuit open and being responsive to a predetermined voltage rise across said capacitors due to the appearance of a fault on said main circuit for completing said auxiliary circuit to shunt said bank of capacitors, said means comprising spaced, elongate, upwardly diverging electrodes positioned a predetermined distance apart to define a calibrated arc gap at their lower end portion across which an arc will become established upon the predetermined voltage rise, and
    (d) normally closed contactor means connected in shunting relation to said fault current limiting means (a) for normally rendering the same inoperative and being responsive to current flow in said auxiliary circuit for opening and rendering said fault current limiting means operative to limit fault current flowing in said main circuit.

2. An electrical circuit according to claim 1 and further comprising:
    (e) contactor means connected in said auxiliary circuit in shunting relation to said electrodes and being responsive to current flow through said auxiliary circuit upon the establishment of an arc between said electrodes for shunting said pair of electrodes to extinguish the arc existing therebetween and to thereby reduce flame and noise normally attendant to the arc existing between said electrodes.

References Cited

UNITED STATES PATENTS 2,207,577    7/1940    Buell _____ 317—12
2,351,986    6/1944    Ludwig et al. _____ 317—12

JOHN F. COUCH, Primary Examiner

J. D. TRAMMELL, Assistant Examiner

U.S. Cl. X.R.

323—74, 105